(No Model.)
G. F. McADAMS.
RINGED ROLLER FOR PRINTING MACHINES, &c.
No. 570,226. Patented Oct. 27, 1896.
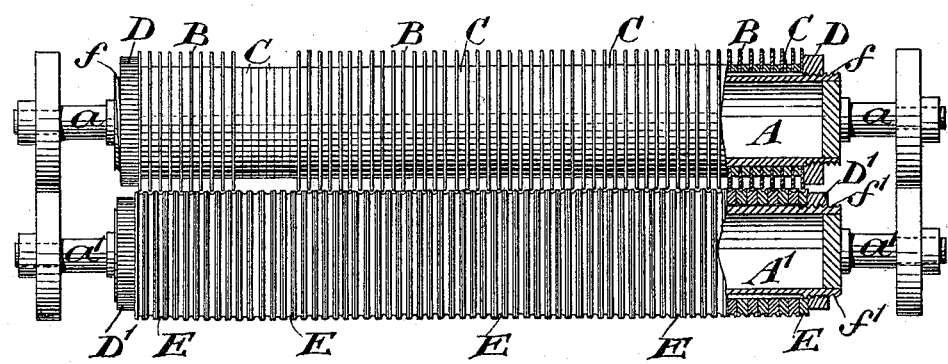
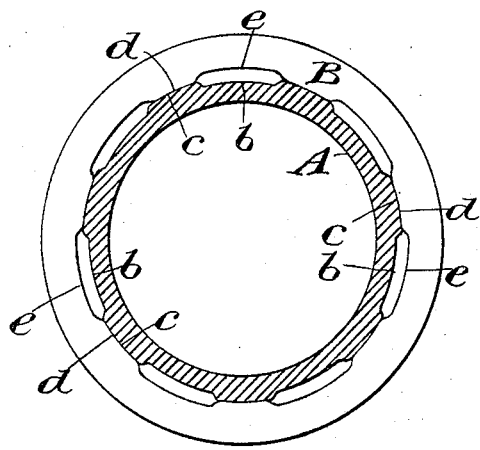
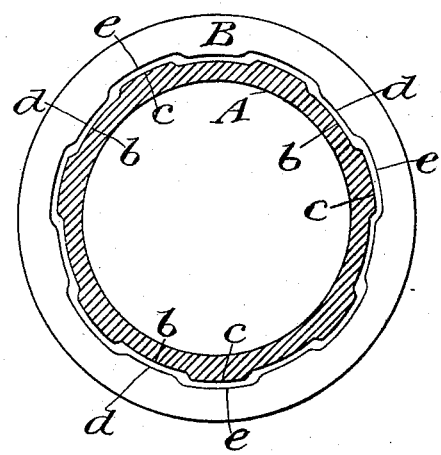
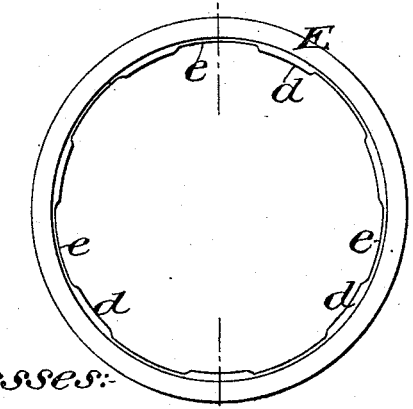
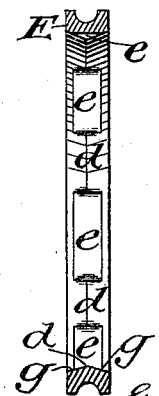
Witnesses:
George Barry Jr.
W. C. Seward.
Inventor:
George F. McAdams
by attorneys
Brown & Seward

UNITED STATES PATENT OFFICE.

GEORGE F. McADAMS, OF BROOKLYN, NEW YORK.

RINGED ROLLER FOR PRINTING-MACHINES, &c.

SPECIFICATION forming part of Letters Patent No. 570,226, dated October 27, 1896.

Application filed February 19, 1896. Serial No. 579,862. (No model.)

*To all whom it may concern:*

Be it known that I, GEORGE F. McADAMS, of the city of Brooklyn, in the county of Kings and State of New York, have invented a new and useful Improvement in Ringed Rollers for Printing-Machines and other Purposes, of which the following is a specification.

This invention, which is more especially designed for the rollers of line-printing machines, is also applicable to other rollers, such, for instance, as those of scoring and cutting machines, the faces or circumferences of which are made up of separate movable or changeable rings.

The object of the invention is to afford facility for placing and securing the rings tightly on the body of the roller concentric with the axis thereof and yet to provide for their easy removal from and replacement upon the roller-body when it is desirable to change them or vary the spaces between them for any purpose, as, for example, to provide, in line-printing machines, for ruling lines at various distances apart.

I will describe in detail rollers with rings embodying my invention and then point out the novelty in claims.

Figure 1 represents a longitudinal view, partly in section, of a printing-roller and corresponding impression-roller of a line-printing machine. Figs. 2 and 3 represent transverse sections of the printing-roller and side views of a ring thereon, illustrating the way, hereinafter described, in which the rings are applied to the roller. Fig. 4 represents a side view of one of the separate rings of the impression-roller, and Fig. 5 an axial section of said ring.

Similar letters of reference designate corresponding parts in all the figures.

A A' designate the bodies of the rollers, which may be solid or hollow, but are represented as hollow, and furnished at their ends with journals $a$ $a'$. The said bodies have provided in them a number of longitudinal grooves $b$ $b$, between which the lands $c$ $c$, represented of approximately the same width as the grooves, are turned truly cylindrical and concentric with the axes of the journals.

B B designate the printing-rings on the roller A, and C C the spacing-rings interposed between said printing-rings. The said rings B B consist of circular disks the inner circumferential edges of which are composed of alternating lands $d$ $d$ and recesses $e$ $e$, the said lands forming a series of arcs concentric with the exteriors of the rings and of such radius that the said lands $d$ will fit snugly to the lands $c$ of the roller-body. The rings B B thus constructed are, when placed on the roller-body, over either end thereof with their recesses $e$ $e$ opposite the lands $c$ $c$ of the body, as shown in Fig. 3, capable of sliding freely along the body to their proper places thereon, and when brought to their proper places they are tightened upon the roller by simply turning them to bring their own lands $d$ $d$ opposite the lands $c$ $c$ of the body, as shown in Fig. 2.

The spacing-rings C C, which I employ with the printing-rings above described, may be made of plain cylindrical form internally, as is common to such spacing-rings, and may have such an easy fit to the lands of the roller-body A that they will slide easily along the said body. The printing-rings with their intervening spacing-rings are clamped together and secured in their proper positions lengthwise of the roller-body by nuts D D, applied to screw-threads $f$ $f$ on the lands of the body. When it is desired to remove the rings B B from the roller-body, one of the nuts D D is removed and the said rings are turned to bring their lands $d$ $d$ opposite the grooves $b$ $b$ of the body and so loosen them on the body, and the rings, together with the spacing-rings C C, can then be easily slipped off over the end of the body. The turning of the rings to loosen them or tighten them may be effected by the grasp of the hand or hands upon several of them together.

An important result to be obtained from the construction of the roller-body with lands and grooves and the printing-rings with lands and intervening recesses, as described, is that it permits the rings, especially when they are thin, as for line-printing, and if they be made of metal having elasticity, such as steel or hand-rolled brass, to be made with their normal inner circumference represented by their lands $d$ $d$ very slightly smaller than the outer circumference of the lands $c$ $c$ of the roller-body, in which case the rings would require to be buckled up very slightly to place them upon the lands of the roller-body. Then the clamping of the rings by the nuts D would, in flattening the rings B B and slightly expanding them circumferentially, insure their being very accurately and tightly centered on the body.

The grooved rings E, of which the face of the impression-roller A is constituted, have their inner circumferences composed, as shown in Figs. 4 and 5, like the inner edges of the printing-rings, of lands $d$ to fit the lands of the roller-body and intervening recesses $e$. These rings may be countersunk from opposite sides in conical form, as shown at $g\ g$ in Fig. 5, so that the lands $d\ d$ have sharp or nearly-sharp edges, which permit them to better adjust themselves to the roller-body when they are screwed up by the nuts D', provided on the screw-threads $f'$ on the terminal portions of the body A'.

Ringed rollers having their bodies and rings constructed and combined as hereinabove described with reference to the printing-roller may have the corresponding concentricity of their several rings B absolutely assured without the grinding to which such rollers are commonly subjected after the assemblage and fastening of their rings, as the said rings may be made of sheet metal by punches and dies which will insure their being exactly alike, and if alike, with their outer circumference and the arcs of their lands respectively concentric, they will when placed upon a truly cylindrical body have their outer circumferential edges in absolute correspondence as parts of a cylindrical surface.

What I claim as my invention is—

1. In a ringed roller, the combination of a longitudinally-grooved cylindrical roller-body and rings having their inner circumferences composed of arc-formed lands with intervening recesses, the said lands fitting the lands between the grooves in the roller-body, substantially as herein described.

2. In a ringed roller, the combination of a longitudinally-grooved cylindrical roller-body screw-threaded at its ends, rings having their inner circumference composed of arc-formed lands with intervening recesses, the said inner circumference being normally less than the circumference of the lands of the roller-body between the grooves thereof, spacing-rings between the first-mentioned rings, and nuts upon the screw-threads of the rollers whereby the several rings are clamped together on the body and tension is produced on the first-mentioned rings, substantially as herein described.

GEORGE F. McADAMS.

Witnesses:
FREDK. HAYNES,
IRENE B. DECKER.